US012133044B2

(12) United States Patent
Hansen et al.

(10) Patent No.: US 12,133,044 B2
(45) Date of Patent: Oct. 29, 2024

(54) HEADPHONE SEALING CUP

(71) Applicant: EPOS Group A/S, Ballerup (DK)

(72) Inventors: Anders Røser Hansen, Ballerup (DK); Peter Vestergaard Værum, Ballerup (DK); Klaus Sommer Ipsen, Vanløse (DK); Johan Grundtvig, Brønshøj (DK); Morten Hessilt Kjær, Ballerup (DK); Giovanni Ferranti, Ballerup (DK)

(73) Assignee: EPOS Group A/S, Ballerup (DK)

( * ) Notice: Subject to any disclaimer, the term of this patent is extended or adjusted under 35 U.S.C. 154(b) by 0 days.

(21) Appl. No.: 18/307,029

(22) Filed: Apr. 26, 2023

(65) Prior Publication Data

US 2023/0328424 A1 Oct. 12, 2023

Related U.S. Application Data

(63) Continuation of application No. 17/488,808, filed on Sep. 29, 2021, now Pat. No. 11,678,104.

(30) Foreign Application Priority Data

Sep. 30, 2020 (EP) .................................... 20199138

(51) Int. Cl.
*H04R 1/10* (2006.01)

(52) U.S. Cl.
CPC ......... *H04R 1/1083* (2013.01); *H04R 1/1008* (2013.01)

(58) Field of Classification Search
CPC .. H04R 1/1008; H04R 1/2807; H04R 1/2811; H04R 1/2815; H04R 1/2819; H04R 1/2823; H04R 1/2826; H04R 1/2838; H04R 1/2842; H04R 1/2846; H04R 1/2849; H04R 5/033
See application file for complete search history.

(56) References Cited

U.S. PATENT DOCUMENTS

| | | | | |
|---|---|---|---|---|
| 5,109,424 A * | 4/1992 | Andre | H04R 1/1008 | 381/384 |
| 5,138,722 A * | 8/1992 | Urella | H04R 1/1008 | D14/206 |
| RE37,398 E * | 10/2001 | Nageno | H04R 5/033 | 381/373 |
| 6,831,984 B2 * | 12/2004 | Sapiejewski | H04R 1/1083 | 181/182 |

(Continued)

FOREIGN PATENT DOCUMENTS

| | | |
|---|---|---|
| EP | 2830324 | 1/2015 |
| EP | 3313087 | 4/2018 |

*Primary Examiner* — Ryan Robinson

(57) ABSTRACT

An earcup for a headphone, comprising at least one earcup comprising a front opening adapted to be adjacent to the ear of a user of the headphone, a baffle disposed within the earcup to define front and rear cavities, an outer cup arranged to accommodate the rear cavities, a first inner cup arranged within the rear cavity surrounding the front opening, a transducer and an earpad extending around the periphery of the front opening of the earcup arranged to accommodate the front cavity and the ear of the user, and wherein the earcup comprises a second inner cup arranged between the outer cup and the back-volume cup for providing an acoustic barrier between outside noise and the ear of the user.

12 Claims, 3 Drawing Sheets

(56) References Cited

U.S. PATENT DOCUMENTS

| | | | | |
|---|---|---|---|---|
| 8,447,058 | B1 * | 5/2013 | Sung | H04R 1/2826<br>381/373 |
| 10,171,905 | B2 * | 1/2019 | Wen | H04R 1/2811 |
| 10,306,350 | B1 * | 5/2019 | Lin | G01S 17/04 |
| 10,419,845 | B2 * | 9/2019 | Muramoto | H04R 1/1008 |
| 10,484,772 | B2 * | 11/2019 | Barrieau | H04R 1/1008 |
| 10,511,900 | B2 * | 12/2019 | Yoneyama | H04R 1/288 |
| 10,687,133 | B2 * | 6/2020 | Ozawa | H04R 9/06 |
| 10,945,058 | B2 * | 3/2021 | Liu | H04R 1/1075 |
| 10,959,005 | B2 * | 3/2021 | Yoneyama | H04R 1/1058 |
| 11,064,283 | B2 * | 7/2021 | Fletcher | H04R 1/1008 |
| 11,368,772 | B2 * | 6/2022 | Tsubone | H04R 1/1066 |
| 11,451,894 | B2 * | 9/2022 | Lin | H04R 1/1008 |
| 2004/0218775 | A1 * | 11/2004 | Huang | H04R 5/033<br>381/186 |
| 2014/0022684 | A1 | 4/2014 | Yang | |
| 2019/0052966 | A1 * | 2/2019 | Hara | H04R 1/1075 |
| 2019/0156814 | A1 * | 5/2019 | Eguchi | G10K 11/17853 |
| 2022/0086550 | A1 * | 3/2022 | Minerbi | H04R 1/105 |
| 2022/0095030 | A1 * | 3/2022 | Pfitsch | H04R 1/2826 |

* cited by examiner

HEADPHONE SEALING CUP

SUMMARY

The invention relates to a headphone sealing cup for higher insertion loss and full speaker tuning is provided.

Current solutions for headphones and hearing protectors are forced to either excel in acoustic insertion loss or have a full set of acoustical speaker tuning parameters.

The outer cup is affecting the passive damping/insertion loss and speaker sound.

The traditional headphone design does not enable passive damping at low frequencies.

The closed design of a hearing protector does not enable a full set of tuning parameters of the speaker sound.

Traditional headphones are built to sound great but lack acoustical insertion loss at low frequencies, due to the openings in the speaker back volume cup and outer cup.

In traditional closed headphone architecture:

- The speaker is fixated to the baffle. In some cases, the speaker can be fixated to other parts.
- The earpads are fixated to the baffle.
- The volume in front of the speaker is coupled to the user's ear. The front volume is defined by baffle, earpads and the user's anatomy.
- Holes in the baffle (between speaker front and rear volume) are used to tune the speaker sound. The holes can be covered by a dampening material.
- The holes in the speaker rear volume cup are used to tune the speaker sound. In some cases, the holes are tubes. In some cases, the holes are covered by a dampening material.

Speaker sound is tuned using the holes in the baffle between speaker front and back volume. In order to improve acoustical insertion loss at low frequencies, the headphone outer cup needs to be completely airtight. This is problematic as the outer cup usually have features (buttons, boom arm etc.) that makes the sealing solutions complex, expensive and hard to produce.

Another issue is that the design of the outer cup is affecting the passive damping/insertion loss and speaker sound, because they are acoustically coupled together.

Traditional hearing protectors have a simple completely closed volume and therefore have acoustical insertion loss at low frequencies. Speaker tuning possibilities are limited by the closed design and the speaker placement.

In traditional completely closed headphone architecture:

- The speaker is fixated to the baffle. In some case the speaker can be fixated to other parts.
- The earpads are fixated to the baffle.
- The volume in front of the speaker is coupled to the user's ear. The front volume is defined by baffle, earpads and the user's anatomy.
- Holes in the baffle (between speaker front and rear volume) are used to tune the speaker sound. The holes can be covered by a dampening material.

A headphone:

FIG. 1 illustrates a possible layout of an earcup of a general headphone. The headphone comprises at least one earcup 1 that may be connected to a headband structure. Through the earcup 1, an acoustic signal, e. g. music, speech, sound or the like, is delivered to the ears 2 of the user.

The headphone furthermore comprises a microphone, however for the scope of the present disclosure it is not necessary for the headphone to feature such microphone.

The headphone comprises an output transducer. The output transducer may be constituted by a receiver (loudspeaker) for providing an acoustic signal to the user.

The headphone may comprise an input unit for providing an electric input signal representing sound. The input unit may comprise an input transducer, e.g. a microphone, for converting an acoustical input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The headphone may comprise antenna and transceiver circuitry (e.g. a wireless receiver) for wirelessly receiving an electric input signal from another device, e.g. from an entertainment device (e.g. a TV-set), a communication device, a wireless microphone, or another headphone. The electric input signal may represent or comprise an audio signal and/or a control signal and/or an information signal.

An aspect of the present disclosure provides an earcup for a headphone, wherein the earcup may be configured to be mounted around the ear of a user/wearer. The earcup may comprise a front opening adapted to be adjacent to the ear of the user of the headphone. The earcup may comprise a baffle disposed within the earcup to define front and rear cavities. The earcup may comprise an outer cup arranged to accommodate the rear cavity. The read cavity may be defined in a space between the baffle and the outer cup. The earcup may comprise a first inner cup arranged within the rear cavity. Such a first inner cup may be configured to surround the front opening. The earcup may comprise a transducer, in particular an acoustic output transducer configured to provide an acoustical signal to the ear of the user. The earcup may comprise an earpad extending around the periphery of the front opening of the earcup arranged to accommodate the front cavity and the ear of the user. Such an earpad may be configured to provide a comfortable interface to the skin of the user, and/or to provide a dampening of external, ambient, sounds to the user. The earcup may comprise a second inner cup arranged between the outer cup and the back-volume cup for providing an acoustic barrier between outside noise and the ear of the user. Such a second inner cup may provide an improved dampening of acoustical sound from the environment, i.e. ambient sounds, so that the user is not bothered by these sounds while listening to e.g. sound from an output transducer in the earcup.

The earcup may comprise that the second inner cup is adapted to acoustically sealing off outside noise and to increase the transmission loss of the earcup. This means that the second inner cup will help isolate/prevent external sounds reaching the ear of the user.

The earcup may configured so that the second inner cup is adapted to increase the transmission loss of the earcup. The second inner cup may provide a greater damping of external sounds.

The earcup may configured so that the transducer is fixated to the baffle. The transducer may be directly or indirectly, via other components, attached or fixated to the baffle.

The earcup may configured so that the earpad is fixated to the baffle. This could allow the earpad to position the baffle and/or the transducer in an optimal position relative to the ear of the user.

The earcup may configured so that the second inner cup is provided with at least one opening for tuning the sound. The size and/or position and/or number of openings may determine which kind of effect the tuning have on sound produced by the transducer. For instance, the earcup may configured so that the opening of the second inner cup is shaped as a hole or a tube.

The earcup may configured so that the at least one opening of the second inner cup is covered by a damping material. Further, the earcup may configured so that the first inner cup is provided with at least one opening for tuning the sound. Still further, the earcup may configured so that the opening of the first inner cup is shaped as a hole or a tube. Even still further, the earcup may be configured so that the at least one opening of the first inner cup is covered by a damping material. These components may help achieve the desired tuning of the sound provided to the user.

The earcup may configured so that the baffle is provided with at least one opening for tuning the sound. Further, the earcup may be configured so that the opening of the baffle is shaped as a hole or a tube. Still further, the earcup may be configured so that the at least one opening of the baffle is covered by a damping material. These features may help achieve the desired tuning of the sound provided to the user.

A further aspect of the present disclosure relates to a headset comprising a first earcup and an optional second earcup, wherein a headband mechanically is coupled to the first and optionally to the optional second earcup, and being configured so that the headset may be arranged on a user's head.

At least one of the first and second earcups may be provided with an input transducer configured to pick up sounds from the user's mouth, i.e., a speech pick-up input transducer. The input transducer may comprise a microphone array of at least two microphones. Further, the headset may comprise a boom arm configured to carry the input transducer, where the boom arm may be articulated so as to be operated between two positions where one position of the arm places the input transducer near the user's mouth so as to efficiently pick up voice from the user. Other features may be included in the headset, such as active noise cancellation, wireless communication, such as Bluetooth communication, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Figure 1:
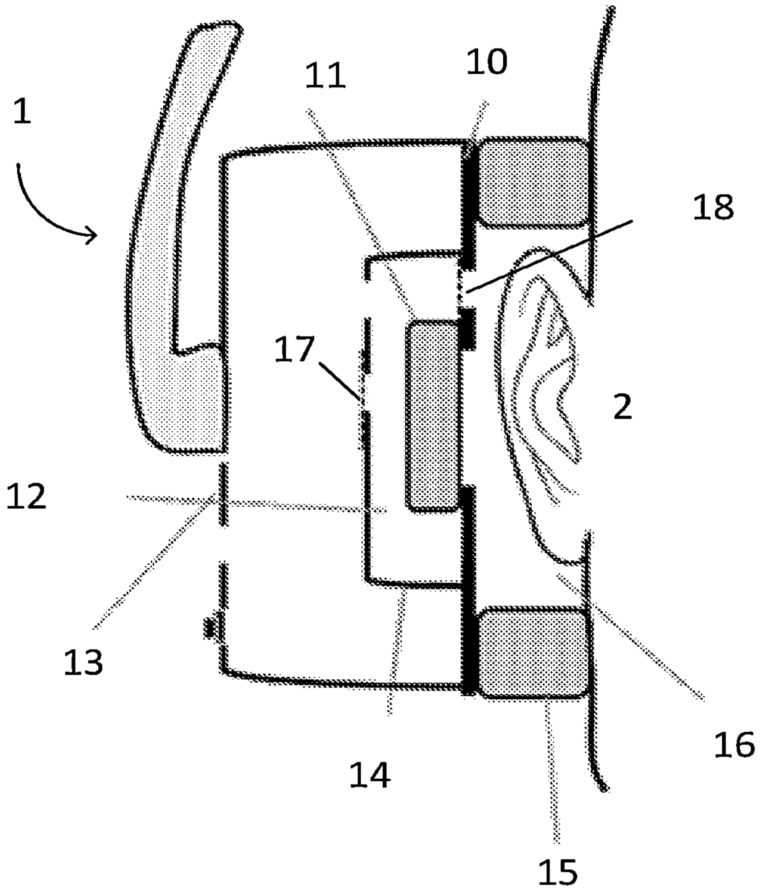
FIG. 1 shows a schematic view of an earcup of prior art.

FIG. 1 shows a traditional closed headphone architecture where the speaker 11 is fixated to the baffle 10. In some cases, the speaker can be fixated to other parts. The earpads 15 are fixated to the baffle 10. The volume in front of the speaker 16 is coupled to the user's ear 2. The front volume 16 is defined by baffle 10, earpad 15 and the user's anatomy 2. Holes 18 in the baffle 10, provided between speaker front 16 and rear volume 12 are used to tune the speaker sound. The holes 18 can be covered by a dampening material. The holes 17 in the speaker rear volume cup 14 are used to tune the speaker sound. In some cases, the holes are tubes. In some cases, the holes are covered by a dampening material. The size, spacing, distribution of the holes can be used to tune the resonance of the transducer.

Figure 2:
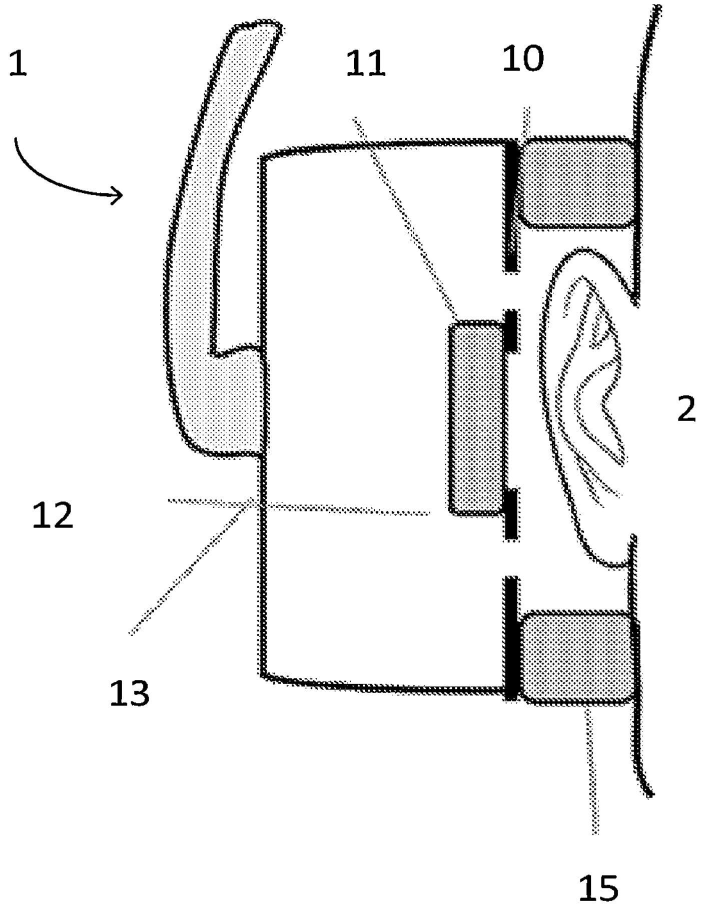
FIG. 2 shows a schematic view of an earcup of prior art.

FIG. 2 shows a traditional completely closed hearing protector architecture, where the speaker 11 is fixated to the baffle 10. In some case the speaker 11 can be fixated to other parts. The earpad 15 is fixated to the baffle 10. The volume in front of the speaker 16 is coupled to the user's ear 2. The front volume 16 is defined by baffle 10, earpad 15 and the user's anatomy 2. Holes 18 in the baffle, provided between speaker front 16 and rear volume 12 are used to tune the speaker sound. The holes 18 can be covered by a dampening material.

The outer cup 13 of a traditional closed and completely closed headphone structure, as shown in FIG. 1 and FIG. 2 is affecting the passive damping/insertion loss and speaker sound. Further, the traditional open design does not enable passive damping at low frequencies and the closed design does not enable a full set of tuning parameters of the speaker.

Figure 3:
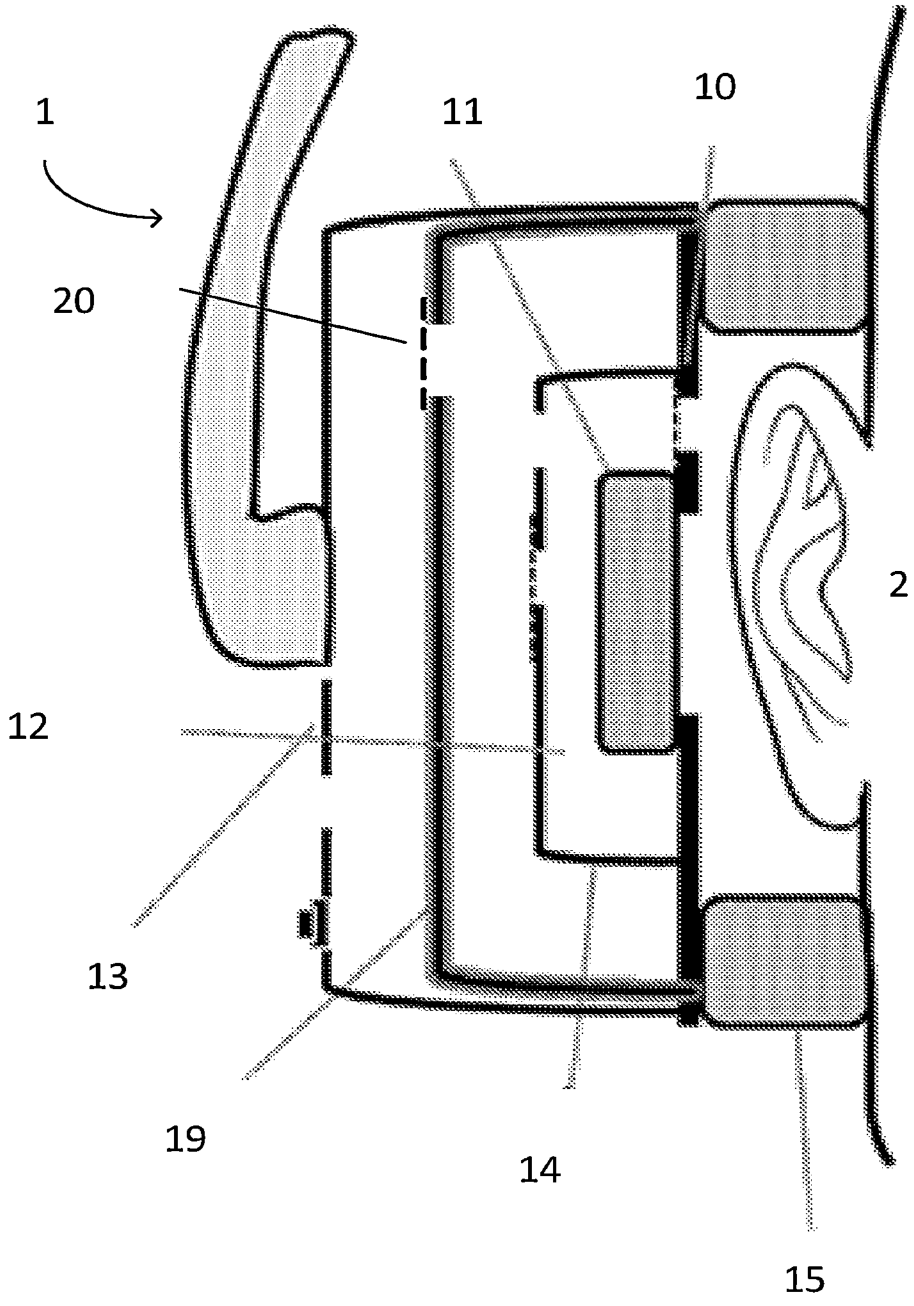
FIG. 3 shows a schematic view of an earcup according to the invention.

The problems with known headphone structures, as shown in FIG. 1 and FIG. 2 is solved by adding an additional cup 19, a sealing cup, between outer cup 13 and speaker cup 14, as shown in FIG. 3. The sealing cup 19 forms a barrier between outside noise and the ear.

The sealing cup 19 is stripped of features with makes the sealing easy. Only electrical wires will need to go through the sealing cup barrier. Speaker 11 is fixated to the baffle 10. In some case the speaker 11 can be fixated to other parts. The earpad 15 is fixated to the baffle 10. The volume in front of the speaker 16 is coupled to the user's ear 2. The front volume 16 is defined by baffle 10, earpad 15 and the user's anatomy 2. Holes 18 in the baffle, provided between speaker front 16 and rear volume 12 are used to tune the speaker sound. The holes 18 can be covered by a dampening material.

The holes 17 in the speaker rear volume cup 14 are used to tune the speaker sound. In some cases, the holes are tubes. In some cases, the holes are covered by a dampening material.

The sealing cup 19 seals off the speaker acoustics, i.e. the speaker back volume cup 14, speaker 11, baffle 10, baffle holes 18 and damping material, front volume 16 and earpad 15, from outside noise.

The outside cup 13 will not affect passive damping/insertion loss or speaker sound. A full setup of speaker tuning parameters is available. The closed design enables passive damping/insertion loss A headphone is provided, comprising at least one earcup 1 comprising a front opening adapted to be adjacent to the ear 2 of a user of the headphone, a baffle 10 disposed within the earcup to define front and rear cavities 12, an outer cup 13 arranged to accommodate the rear cavities, a first inner cup or a back-volume cup 14 arranged within the rear cavity surrounding the front opening, a transducer, e.g. a speaker, and an acoustically sealing earpad 15 extending around the periphery of the front opening of the earcup 1 arranged to accommodate the front cavity and the ear 2 of the user. The headphone comprises a second inner cup 19 arranged between the outer cup 13 and the back-volume cup 14 for providing an acoustic barrier between outside noise and the ear 2 of the user.

The second inner cup 19 is adapted to acoustically sealing off outside noise and to increase the transmission loss of the earcup. The second inner cup 19 may be adapted to increase the transmission loss of the earcup 1. In one example, the second inner cup 19 is provided with at least one opening 20 for tuning the sound. The opening 20 of the second inner cup 19 may be shaped as a hole or a tube. In one example, the at least one opening 20 of the second inner cup is covered by a damping material.

In one example, the first inner cup or back-volume cup 14 is provided with at least one opening 17 for tuning the sound. The opening 17 of the first inner cup is shaped as a hole or a tube.

In one example, the at least one opening 17 of the first inner cup 14 is covered by a damping material.

In one example, the baffle 10 is provided with at least one opening 18 for tuning the sound. The opening 18 of the baffle is shaped as a hole or a tube. In one example the at least one opening 18 of the baffle 10 is covered by a damping material.

The front cavity is defined by the baffle 10, earpad 15 and the anatomy of the ear 2 of the user.

The transducer or speaker 11 may be fixated to the baffle 10.

The earpad 15 is fixated to the baffle 10.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure.

The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. An earcup for a headset, the earcup comprising:

a front opening adapted to be adjacent to the ear of a user of the headset;

a baffle disposed within the earcup to define a front cavity and a rear cavity;

an outer cup having a first back wall and first side walls, the outer cup arranged to accommodate the rear cavity;

an inner cup having a second back wall and second side walls, the inner cup arranged within the rear cavity surrounding the front opening; and an intermediary cup having a third back wall and third side walls, the intermediary cup arranged between the outer cup and the first inner cup;

wherein the first back wall, the second back wall, and the third back wall are different surfaces.

2. A headset comprising the earcup of claim 1.

3. The headset of claim 2, further comprising a second earcup.

4. The headset of claim 2, further comprising a boom arm comprising an input transducer, wherein the boom arm is configured to translate between a first position and a second position, wherein the first position is nearer to the user's mouth than the second position.

5. The earcup of claim 1, wherein said intermediary cup is adapted to acoustically sealing off outside noise and to increase transmission loss of the earcup.

6. The earcup of claim 1, wherein said intermediary cup is adapted to increase transmission loss of the earcup.

7. The earcup of claim 1, wherein the earcup comprises a transducer fixated to the baffle.

8. The earcup of claim 1, wherein the earcup comprises an earpad fixated to the baffle.

9. The earcup of claim 8, wherein the front cavity is defined by the baffle, the earpad, and the anatomy of the ear of the user.

10. The earcup of claim 1, wherein the intermediary cup is provided with at least one opening for tuning sound.

11. The earcup of claim 1, wherein the inner cup is provided with at least one opening for tuning sound.

12. The earcup of claim 1, wherein the baffle is provided with at least one opening for tuning sound.

* * * * *